United States Patent [19]
Yezrielev et al.

[11] Patent Number: 6,051,674
[45] Date of Patent: *Apr. 18, 2000

[54] POLYMERIC VEHICLES WHICH INCLUDE A PHENOL BLOCKED ISOCYANATE HAVING ALIPHATIC HYDROXYL FUCNTIONALITY

[75] Inventors: Albert I. Yezrielev, Houston, Tex.; Frank N. Jones, Ann Arbor; Ramachandran P. Subrayan, Ypsilanti, both of Mich.; Vijay Swarup, Houston, Tex.

[73] Assignee: Exxon Chemical Patents, Inc., Baytown, Tex.

[ * ] Notice: This patent is subject to a terminal disclaimer.

[21] Appl. No.: 08/702,966

[22] Filed: Aug. 26, 1996

[51] Int. Cl.[7] .......................... C08G 18/80; C08G 18/42; C08G 18/62; C08G 18/58; C07L 75/04; C07L 75/06; C07L 63/00; C07C 271/40

[52] U.S. Cl. .......................... 528/45; 525/123; 525/124; 525/132; 525/329.9; 525/330.5; 525/437; 525/440; 525/443; 525/452; 525/453; 525/454; 525/455; 525/456; 525/457; 525/460; 525/528; 528/75; 528/80; 528/83; 528/85; 560/24; 560/25; 560/26; 560/115; 560/157; 560/158; 560/330; 560/335; 560/354; 560/355

[58] Field of Search .................... 528/45, 75, 80, 528/83, 85; 560/24, 25, 26, 115, 157, 158, 330, 335, 354, 355; 525/123, 124, 452, 453, 440, 132, 329.9, 330.5, 437, 443, 454, 455, 456, 457, 460, 528

[56] References Cited

U.S. PATENT DOCUMENTS

| | | | |
|---|---|---|---|
| 3,409,579 | 11/1968 | Robins | 523/143 |
| 3,655,625 | 4/1972 | Thomas | 528/45 |
| 3,789,044 | 1/1974 | Taft et al. | 528/73 |
| 3,836,491 | 9/1974 | Taft et al. | 528/53 |
| 4,031,068 | 6/1977 | Cantor | 525/351 |
| 4,130,549 | 12/1978 | Ueno et al. | 528/93 |
| 4,331,782 | 5/1982 | Linden | 525/173 |
| 4,343,839 | 8/1982 | Blegan | 427/340 |
| 4,365,039 | 12/1982 | Blegan | 524/773 |
| 4,374,167 | 2/1983 | Blegan | 428/141 |
| 4,374,181 | 2/1983 | Blegen | 428/423.3 |
| 4,877,838 | 10/1989 | Toman | 525/107 |
| 4,888,441 | 12/1989 | Calbo, Jr. | 560/198 |
| 4,922,002 | 5/1990 | Calbo, Jr. et al. | 528/286 |
| 5,019,100 | 5/1991 | Hennink et al. | 623/6 |
| 5,166,289 | 11/1992 | Yezrielev et al. | 525/443 |
| 5,210,155 | 5/1993 | Yezrielev et al. | 525/442 |
| 5,235,006 | 8/1993 | Jones et al. | 525/510 |
| 5,239,018 | 8/1993 | Yezrielev et al. | 525/418 |
| 5,322,884 | 6/1994 | Wellman et al. | 524/601 |
| 5,326,831 | 7/1994 | Yezrielev et al. | 525/437 |
| 5,334,652 | 8/1994 | Wellman et al. | 524/601 |
| 5,334,671 | 8/1994 | Yezrielev et al. | 525/443 |
| 5,453,469 | 9/1995 | Yezrielev et al. | 525/418 |
| 5,458,920 | 10/1995 | Yezrielev et al. | 427/385.5 |
| 5,681,906 | 10/1997 | Yezreilev et al. | 525/450 |
| 5,955,550 | 9/1999 | Jones et al. | 525/440 |

FOREIGN PATENT DOCUMENTS

| | | |
|---|---|---|
| 213925 | 3/1987 | European Pat. Off. . |
| 0419088 | 3/1991 | European Pat. Off. . |
| 2809768 | 9/1978 | Germany . |
| 0155840 | 6/1993 | Japan . |
| 1290848 | 9/1972 | United Kingdom . |
| WO 96 23016 | 8/1996 | WIPO . |

OTHER PUBLICATIONS

Swarup, et al., "Thermoset Coating Compositions Having Improved Hardness," Research Disclosure No. 374, pp. 446–457, (Jun. 1995), Kenneth Mason Publications, Ltd., Hampshire, England.

Stumpe et al., "Deactivation of Excited States in Polyurethanes by Energy Transfer to Salicyclic Acid Derivatives and its Application to the Photo–stabilisation of Polyurethanes", Polymer Degradation and Stability 17 (1987) 103–115.

Primary Examiner—Rabon Sergent
Attorney, Agent, or Firm—Fitch, Even, Tabin & Flannery

[57] ABSTRACT

The present invention is directed to a polymeric vehicle, the formulated coating composition and a coating binder made from the polymeric vehicle and a method for making the polymeric vehicle where the polymeric vehicle includes a phenol blocked isocyanate having reactive aliphatic hydroxyl groups. The phenol blocked isocyanate may be made from a phenolic ester alcohol having at least one aliphatic hydroxyl group and one phenolic hydroxyl group.

31 Claims, No Drawings

POLYMERIC VEHICLES WHICH INCLUDE A PHENOL BLOCKED ISOCYANATE HAVING ALIPHATIC HYDROXYL FUCNTIONALITY

FIELD OF THE INVENTION

The present invention relates to polymeric vehicles for coating films or binders where the polymeric vehicles are thermosetting and include a phenol blocked isocyanate having a reactive aliphatic hydroxyl functionality. More particularly this invention is directed to polymeric vehicles which include at least one polyol, the phenol blocked isocyanate and a polyisocyanate and/or amino resin crosslinking agent.

BACKGROUND OF THE INVENTION AND DESCRIPTION OF THE PRIOR ART

One of the primary components in paint is the "film former" that provides a film for the protective function of a substrate coated with paint. Film forming components of liquid paints include resins which have required organic solvents to provide the resins with suitable viscosities such that the paint can be applied by existing commercial application equipment. Use of solvents, however, raises at least two problems. First, in the past and potentially in the future, petrochemical shortages mitigate against the use of organic solvent in great volumes. Second, environmental concern mitigates against the use of organic solvents and requires such use be minimized.

Thermosetting coating compositions, particularly coating compositions which include polyester, alkyd, acrylic and epoxy polymers are often materials of choice for making film formers for various substrates to which the coating composition is applied. Coating compositions provide a protective function for the substrate. Hence, coating compositions are generally formulated to provide a balance of properties which will maximize hardness, flexibility, solvent resistance, corrosion resistance, weatherability, acid resistance, hydrolytic stability and gloss with an emphasis on certain properties depending upon the purpose for which the coating is intended.

It has been a continuing challenge to provide coating compositions which upon thermosetting provide films with desired film properties such as hardness, flexibility, solvent resistance, corrosion resistance, weatherability, acid resistance, hydrolytic stability and gloss, reduce VOCs, the toxicity of the coating composition and still retain the ability to have the viscosities of the polymeric vehicle and formulated coating composition made therefrom such that the formulated coating composition can be applied with existing commercial application equipment.

U.S. Pat. No. 4,331,782 to Linden, U.S. Pat. Nos. 3,836,491 and 3,789,044 to Taft et al. and U.S. Pat. No. 3,409,579 to Robbins describe phenol capped polymers which are crosslinked with polyisocyanates. They do not involve the use of a phenol blocked isocyanate having aliphatic hydroxyl functionality which is crosslinked or the use of such a phenol blocked isocyanate in a system which includes a polyol, phenol blocked isocyanate and crosslinking agent.

OBJECTS OF THE INVENTION

It is an object of the invention to provide a compound with polyisocyanate functionality which is blocked with a phenolic alcohol which isocyanate blocked compound has free aliphatic hydroxyl groups.

It is another object of the invention to provide a phenol blocked isocyanate which is blocked with a phenolic blocking group which upon unblocking may serve as a hardener and/or reactant in a polymeric vehicle.

It is yet another object of the invention to reduce the toxicity effect of phenolic blocking agents for isocyanates.

It also is an object of the invention to provide a coating composition which will maximize film properties such as hardness, flexibility, solvent resistance, corrosion resistance, weatherability, acid resistance, hydrolytic stability and gloss.

It is another object of the invention to provide a coating composition which will be low in VOCs.

Further objects and advantages of the invention will be found by reference to the following description.

SUMMARY OF THE INVENTION

The present invention is directed to a phenol blocked isocyanate with a phenolic blocking group having at least one reactive aliphatic hydroxyl group. The invention also is directed to a polymeric vehicle, a formulated coating composition, a coating binder made from the polymeric vehicle and a method for making the polymeric vehicle where the polymeric vehicle includes the phenol blocked isocyanate with reactive aliphatic hydroxyl functionality. The latter phenol blocked isocyanate improves film properties such as hardness and in certain aspects permits low cure temperatures by virtue of having available reactive aliphatic hydroxyl groups which will readily react with crosslinkers which are reactive with compounds with reactive hydrogens.

In the invention the phenolic hydroxyl group of a phenolic alcohol bonds onto the isocyanate functionality of an isocyanate compound. The phenolic alcohol has at least one aliphatic hydroxyl group. When the phenolic alcohol unblocks from the isocyanate group, the phenolic alcohol may serve as a multi functional reactant and hardener in a coating composition which includes polyols. In an important aspect, the composition includes crosslinkers which are additional to the phenol blocked isocyanate. Although phenolic blocking agents have been traditionally regarded as potentially toxic, the result of the invention is that a phenol blocking agent may be desirably used in improving the properties of a coating binder while being incorporated into the binder and kept from having a toxic effect in the atmosphere.

When the components of the polymeric vehicle are at low molecular weights and when the phenol blocked isocyanate is at low molecular weights such as in the range of from about 500 to about 1400, the phenol blocked isocyanate unblocks and hardens the coating binder often without substantially increasing the viscosity of the polymeric vehicle and coating composition. In an important aspect, the invention provides a high solids polymeric vehicle and/or formulated coating composition where the viscosity of the blend which constitutes the polymeric vehicle (which includes the phenol blocked isocyanate), will be in the range of from about 0.1 to about 20 Pa.s at about 20 to about 60° C. at a shear rate of at least about 1,000 and preferably in the range of about 1,000 to about $1 \times 10^6$ sec.$_{-1}$ at 70 weight percent solids or more.

The coating composition is crosslinked with the phenol blocked isocyanate and may include at least one additional crosslinker selected from the group consisting of an isocyanate compound with isocyanate functionality, an amino resin having an average crosslinking functionality of from about 3 to about 30 crosslinking groups per molecule, and an epoxy resin with polyfunctional epoxy functionality. The amino crosslinking functionality of the amino resin is reactive with the aliphatic hydroxyls of the phenol blocked isocyanate and the isocyanate crosslinker compound which isocyanate crosslinker has an average isocyanate functionality of from about 1.9 to about 20 isocyanate groups per molecule. The isocyanate functionality is reactive with the aliphatic hydroxyls of the phenol blocked isocyanate diluent and the amino resin.

In copending patent application Ser. No. 08/621,177, a phenolic reactive diluent having reactive phenolic hydroxyl groups is described. In that application, the reactive diluent is described with the 10 following general formula I, where $R_1$ through $R_{12}$ is set forth below.

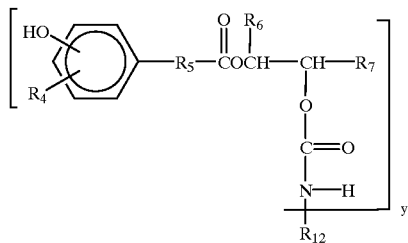

where Y=1 to 4, where $R_{12}$ is an alkyl, difunctional alkyl radical, alkenyl, difunctional alkenyl radical, alkylene, such as methylene, aromatic or difunctional aromatic radical and where $R_1$ through $R_{11}$ is set forth below in connection with formulas A through C. $R_{12}$ is further described below.

The above phenolic reactive diluent may be made by reacting a phenolic ester alcohol and a compound having an isocyanate functionality via a reaction which is catalyzed by soluble tin salts, such as dibutyl tin acetate and dibutyl tin dilaurate, or divalent zinc salts such as zinc diacetate.

In contrast, the phenol blocked isocyanate of the instant invention has reactive aliphatic hydroxyls groups, and, in an important aspect, may be represented by the following general formulas where the $R_1$ through $R_{12}$ and Y and $Y_1$ is set forth above and below.

"A"

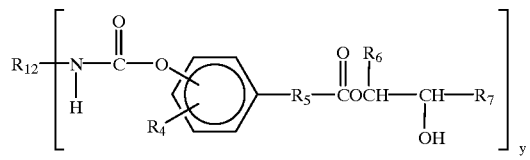

"B"

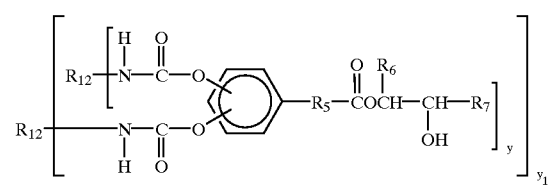

In an important aspect, the general formula of the phenolic blocked isocyanate is A.

The phenol blocked isocyanate may be made without a catalyst at elevated temperatures. But in an important aspect, it is made with an amine catalyzation by the reaction of a phenolic ester alcohol, which may have general formula C set forth below, with an isocyanate compound having an isocyanate functionality of at least about 1.9.

"C"

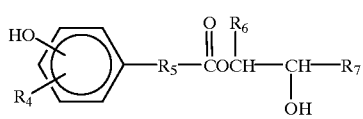

The availability of reactive aliphatic hydroxyls on the phenol blocked isocyanate in some instances will permit lower curing temperatures because of the general high reactivity of aliphatic hydroxyl groups. Surprisingly, the phenolic hydroxyl group in the phenolic ester alcohol in the presence of a catalyst reacts with the compound with isocyanate functionality to provide a urethane linkage at the location of the phenolic hydroxyl group in the phenolic ester alcohol. This reaction leaves aliphatic hydroxyl groups for further reaction with additional crosslinkers and polyols to make a coating binder. As used herein, phenolic hydroxyl group means the hydroxyl group bonded onto the aromatic ring of the phenolic ester alcohol. The —OH group shown as bonded to the —CH— group in formula C is illustrative of an aliphatic hydroxyl group.

In very important aspects, the phenolic blocked isocyanate has the formulas

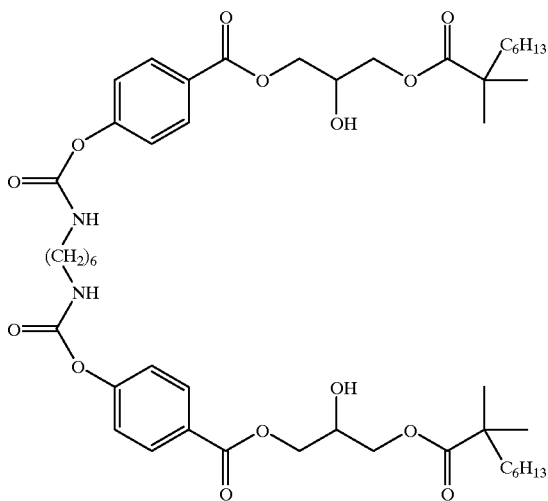

1 and

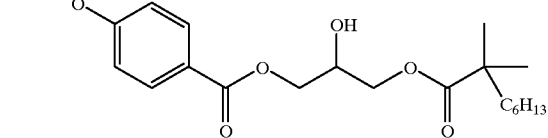

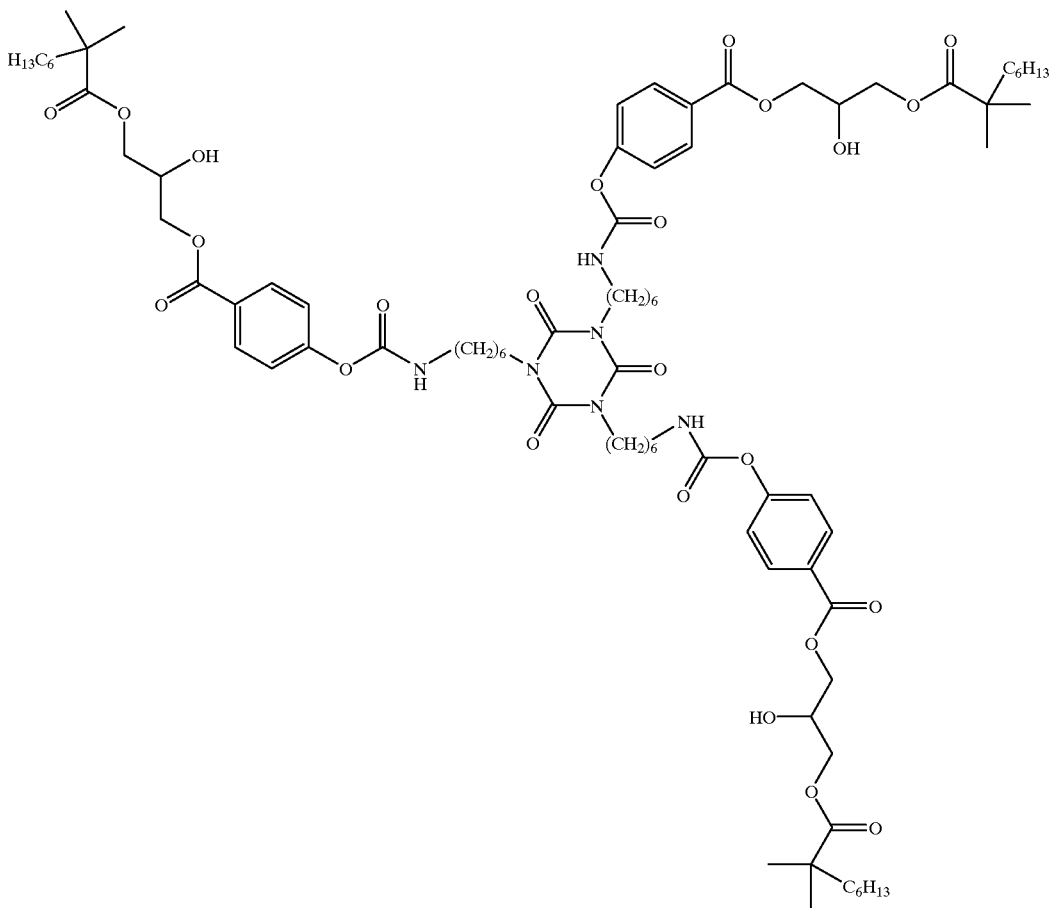

2

In one important aspect, the phenolic ester alcohol, which alcohol blocks the isocyanate functionality of the isocyanate compound, has at least two ester linkages, at least one phenolic hydroxyl group and at least one aliphatic hydroxyl group, and in a very important aspect, about one aliphatic hydroxyl group which aliphatic hydroxyl is primary or secondary. Included in this aspect, the phenolic ester alcohol has the general formula C wherein $R_4$ is selected from the group consisting of hydrogen, halogen, hydroxyl, $C_1$ to $C_8$ alkyl and $C_1$ to $C_8$ alkoxy, $R_5$ is a direct bond or a $C_1$ to $C_{20}$ organic radical which may incorporate another phenol or aliphatic hydroxyl, ester, ether and/or carbonate group in its structure, $R_6$ is hydrogen or a $C_1$ to $C_{20}$ organic radical which may include one or more ester linkages or a direct bond which may form with $R_7$ part of a 5 or 6 carbon atom cyclic ring structure, $R_7$ is $CH_2R_8$ wherein $R_8$ is selected from the group consisting of hydroxy, $OR_9$, $OOCR_{10}$, and $R_{11}$ wherein $R_9$ is a primary or secondary aliphatic group containing 3 to 20 carbon atoms which may include one or more ester linkages or an aromatic group containing 6 to 20 carbon atoms, $R_{10}$ is a primary, secondary or tertiary aliphatic group containing 4 to 20 carbon atoms which may include one or more ester linkages or an aromatic group containing 6 to 20 carbon atoms, and $R_{11}$ is a $C_2$ to $C_{20}$ organic radical which may include one or more ester linkages and where the organic radical may form with $R_6$ part of a 5 or 6 carbon atom cyclic ring structure. In a particularly important aspect, $R_5$ or $R_8$ has the ester linkages or groups. As used herein, an ester group or linkage means

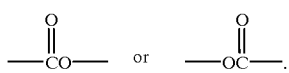

As noted above, the —OH expressly shown as bonded to the —CH— group in formula C is illustrative of an aliphatic hydroxyl group.

In another important aspect of the invention, the phenolic ester alcohol is the reaction product of an hydroxybenzoic acid, such as para hydroxybenzoic acid, and a monoglycidyl compound having a molecular weight in the range of from about 110 to 1000 such as the monoglycidyl compound with the formula ("D")

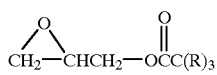

D where R represents a mixture of aliphatic groups, most preferably the three R groups in the glycidyl compound having a total of 8 carbon atoms and which glycidyl compound is commercially available from Exxon Chemical Company under the trademark Glydexx®.

In yet another important aspect of the invention, the polymeric vehicle comprises the phenol blocked isocyanate having reactive aliphatic hydroxyl groups; at least one polyol having an average hydroxyl functionality of from about 1.9 to about 20 hydroxyls per molecule and a molecular weight of at least 200; and at least one additional crosslinker selected from the group consisting of an isocyanate compound having an isocyanate functionality of from about 1.9 to about 20 isocyanate groups per molecule, an amino resin having a crosslinking functionality of from about 3 to about 30 crosslinking groups per molecule, mixtures of the isocyanate compound and amino resin, and a polyfunctional epoxy resin. In an important aspect, the polymeric vehicle comprises a blend of phenolic blocked isocyanate and an amino resin crosslinker.

In a very important aspect of this invention, the polymeric vehicle includes the polyol which is a polyester, alkyd or acrylic polyol, a phenol blocked isocyanate having one reactive aliphatic hydroxyl group made with the phenolic ester alcohol having one aliphatic hydroxyl group, where the isocyanate compound used to make the phenol blocked isocyanate has an average isocyanate functionality of about 3 and an amino resin crosslinker. In the aspect of the invention which includes polyol, phenolic blocked isocyanate and crosslinker, each is in relative amounts effective for providing an acceptable coating binder which generally will have a pencil hardness of at least about HB, an impact resistance of at least about 20-inch pounds direct and at least about 20-inch pounds reverse at a film thickness of about 0.5 mil dry.

In an important aspect, the coating binder will have a hardness of about F at a thickness of about 0.5 mil dry and an impact resistance of about 30-inch pounds direct and 30-inch pounds reverse at such thickness.

Generally the polymeric vehicle may have from about 0 to about 80 weight percent polyol, from about 10 to about 80 weight percent phenol blocked isocyanate having reactive aliphatic hydroxyl groups and from about 8 to about 50 weight percent crosslinker where the crosslinker is an amino resin and from about 8 to about 50 weight percent crosslinker where the crosslinker has an isocyanate functionality. Where a polyol is present in the blend of the polymeric vehicle, the polymeric vehicle generally will comprise at least about 15 weight percent polyol and preferably will have from about 15 to about 60 weight percent polyol.

DESCRIPTION OF THE PREFERRED EMBODIMENTS

"Polyester" means a polymer which has —C(=O)O— linkages in the main chain of the polymer.

"Polyisocyanate" can mean compounds with two or more isocyanate groups [—N=C=O] which compounds may be biurets and isocyanurates.

"Biuret" means an isocyanate reacted with water in a ratio of three equivalents of isocyanate to one mole of water, such as the biuret of HDI shown below:

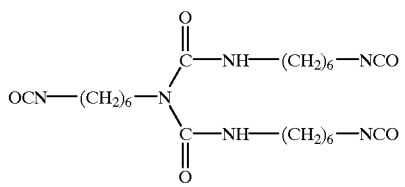

An "isocyanurate" is a six-membered ring having nitrogens at the 1, 3 and 5 positions and keto groups at the 2, 4 and 6 positions, the nitrogens being substituted with an isocyanate group, such as shown below in the isocyanurate of HDI.

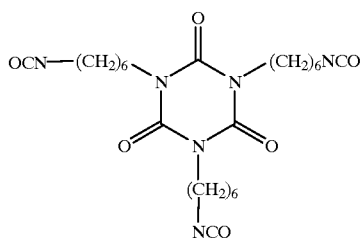

"Phenolic blocked isocyanate having reactive aliphatic hydroxyl groups" means a compound which has isocyanate functionality, such as an isocyanate, isocyanurate or biuret, which isocyanate functionality is blocked with a phenolic blocking group having at least one aliphatic hydroxyl group, where the isocyanate group is blocked with the phenolic blocking group through a phenolic oxygen on the aromatic phenyl ring of phenolic blocking and where the aliphatic hydroxyl group is free and unreacted.

"Phenolic blocking group" is the group which blocks the isocyanate through the oxygen on the phenyl ring of the phenolic alcohol as described herein. The phenolic blocking group has an aliphatic hydroxyl group which is free and unreacted and the structure of the phenolic alcohol as described herein, with the hydrogen on the phenol hydroxyl group being removed to provide a "phenolic oxygen." By way of example, the phenolic blocking group has the structure as shown below

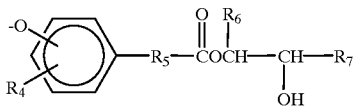

"Crosslinking agent" means a polyfunctional compound capable of reaction with a hydroxyl of a polyol or a phenol hydroxyl or both. These agents include a compound having di- or polyfunctional isocyanate groups or a polyfunctional amino resin or a polyfunctional epoxy resin. The isocyanate compound or amino resin contains isocyanate or other crosslinking functional groups that are capable of forming covalent bonds with hydroxyl groups that are present on the polyol in the polymeric vehicle. The crosslinking agent may be a blend; hence, there may be more than one substance which forms a blend of substances which form covalent bonds with the hydroxyl groups of the polyol. Amino reins, polyepoxies and polyisocyanates are such crosslinking agents.

"Polymeric vehicle" means polymeric and resinous components in the formulated coating, i.e., before film formation, including but not limited to the polyol and phenolic blocked isocyanate having reactive aliphatic hydroxyl groups.

"Coating binder" means the polymeric part of the film of the coating after solvent has evaporated and after crosslinking.

"Formulated coating" composition means the polymeric vehicle and optional solvents, as well as pigments, catalysts and additives which may optionally be added to impart desirable application characteristics to the formulated coating and desirable properties such as opacity and color to the film.

"VOC" means volatile organic compounds.

"Diol" is a compound, oligomer or polymer with two hydroxyl groups. "Polyol" is a compound, oligomer or polymer with two or more hydroxyl groups.

"Solvent" means an organic solvent.

"Organic solvent" means a liquid which includes but is not limited to carbon and hydrogen and has a boiling point in the range of from about 30° C. to about 300° C. at about one atmosphere pressure.

"Volatile organic compounds" are defined by the U.S. Environmental Protection Agency at 40 C.F.R. 51.000 of the Federal Regulations of the United States of America as any compound of carbon, excluding carbon monoxide, carbon dioxide, carbonic acid, metallic carbides or carbonates, and ammonium carbonate, which participates in atmospheric photochemical reactions.

This includes any such organic compound other than then following, which have been determined to have negligible photochemical reactivity: acetone; methane; ethane; methylene chloride (dichloromethane); 1,1,1-trichloroethane (methyl chloroform); 1,1,1-trichloro-2,2,2-trifluoroethane (CFC-113); trichlorofluoromethane (CFC-11); dichlorodifluoromethane (CFC-12); chlorodifluoromethane (CFC-22); trifluoromethane (FC-23); 1,2-dichloro-1,1,2,2-tetrafluoroethane (CFC-114); chloropentafluoroethane (CFC-115); 1,1,1-trifluoro 2,2-dichloroethane (HCFC-123); 1,1,1,2-tetrafluoroethane (HF-134a); 1,1-dichloro 1-fluoroethane (HCFC-141b); 1-chloro 1,1-difluoroethane (HCFC-142b); 2-chloro-1,1,1,2-tetrafluoroethane (HCFC-124); pentafluoroethane (HFC-125); 1,1,2,2-tetrafluoroethane (HFC-134); 1,1,1-trifluoroethane (HFC-143a); 1,1-difluoroethane (HFC-152a); and perfluorocarbon compounds which fall into these classes:

(i) Cyclic, branched, or linear, completely fluorinated alkanes;

(ii) Cyclic, branched, or linear, completely fluorinated ethers with no unsaturations;

(iii) Cyclic, branched, or linear, completely fluorinated tertiary amines with no unsaturations; and (iv) Sulfur containing perfluorocarbons with no unsaturations and with sulfur bonds only to carbon and fluorine. Water is not a VOC.

A "film" is formed by application of the formulated coating composition to a base or substrate, evaporation of solvent, if present, and crosslinking.

The invention is directed to a phenol blocked isocyanate having reactive aliphatic hydroxyl groups and a polymeric vehicle which comprises a phenol blocked isocyanate as herein described. Generally, the polymeric vehicle also comprises a polyol and/or an additional crosslinker selected from the group consisting of a polyfunctional amino resin, an isocyanate compound having polyfunctional isocyanate functionality, mixtures of the polyfunctional amino resin and polyfunctional isocyanate compound, and a polyfunctional epoxy resin. The polymeric vehicle and formulated coating compositions which include the polymeric vehicle of the invention may include organic solvents or may not require organic solvents or water to provide a formulated coating composition with a viscosity such that the formulated coating composition may be applied by existing application equipment. Alternatively, in another aspect, the polymeric vehicle and/or formulated coating composition of the invention permit the use of water for obtaining such a viscosity while reducing or mitigating VOCs. The phenolic blocked isocyanate having reactive aliphatic hydroxyl groups of the invention at low molecular weights, such as in the range of from about 500 to about 1400, improves film properties such as hardness often without substantially increasing the viscosities of the polymeric vehicle and formulated coating composition. Further the phenolic blocked isocyanate of the invention may unblock to provide an isocyanate crosslinker and phenolic alcohol hardener which also are compatible with and permit the use of other diphenolic hardeners to improve coating properties. The phenol blocked isocyanate of the invention also permits the use of the additional hardeners in a formulated coating composition which may include solvents.

In high solids formulated coating compositions which include organic solvents (such as about 75 weight percent solids), one aspect of the invention contemplates the crosslinker, phenol blocked isocyanate of the invention and polyol, if any, being in amounts effective for maintaining VOCs in the formulated coating composition (which includes the polymeric vehicle) to less than about 3.5 pounds of VOC per gallon of formulated coating composition while at least maintaining the pencil hardness of the coating binder, to at least about HB and maintaining an impact resistance of the coating binder to at least about 20-inch pounds direct and at least about 20-inch pounds indirect. Indeed in the high solids aspect of the invention, the invention is effective for providing formulated coating compositions having less than 2.5 pounds of VOC per gallon of formulated coating composition.

The Phenol Blocked Isocyanate

The phenol blocked isocyanate serves as a hardener for the polymeric vehicle to which it is added. It may serve as a hardener in at least two ways: (1) multifunctional isocyanate becomes available after unblocking from the phenolic blocking group which becomes a phenolic alcohol; and (2) after unblocking, the phenolic alcohol serves as a multifunctional hardener which is reactive with other components of the polymeric vehicle. Further, incorporating the phenol blocking group into the coating binder mitigates the problem of having a toxic phenol blocking agent released upon the curing of the coating.

In one aspect, the phenol blocked isocyanate having reactive aliphatic hydroxyl groups may be described as the reaction product of a phenolic ester alcohol having at least one aliphatic hydroxyl group and a compound having an average isocyanate functionality of at least 1.9. In this aspect, the ratio of an isocyanate to phenolic ester alcohol in the reaction mixture is in the range of about 1 equivalent isocyanate group per equivalent of phenolic hydroxyl of the phenolic ester alcohol. The unblocked isocyanate reacts with the phenolic hydroxyl. This provides an urethane linkage at each phenolic oxygen on the phenolic blocking group, leaving the aliphatic hydroxyl group on the phenolic blocking group free and unreacted. The blocked isocyanate of the invention is not polymeric because the phenolic oxygen forms part of an urethane linkage, but the aliphatic hydroxyl group is unreacted. Both ends of the phenolic blocking group of the blocked isocyanate of the invention are not bound as part of urethane linkages which form a two or three dimensional polymeric matrix. In an important aspect, there is only one urethane linkage at one phenolic oxygen which oxygen is associated one phenolic blocking group. In this aspect, two or more blocking groups block two or more isocyanate groups on the same isocyanate compound. In an important aspect, the reaction to make the blocked isocyanate is catalyzed by a tertiary amine, which in an important aspect, is 1,4-diazabicyclo[2.2.2]octane (DABCO), but also may be catalyzed with tertiary phosphines and carbonates.

In another aspect, the phenol blocked isocyanate of the invention has the general formulas A and B, as described above, where $R_1$ through $R_{11}$ are defined above in connection with formula A and $R_{12}$ is defined as set forth below, where N=1 to 4, $N_1$=1 to 4, where $R_{12}$ is an alkyl, alkenyl, aromatic or alkyl, alkenyl and aromatic difunctional radical or alkyl, alkenyl and aromatic trifunctional radical, where the radical can include or be

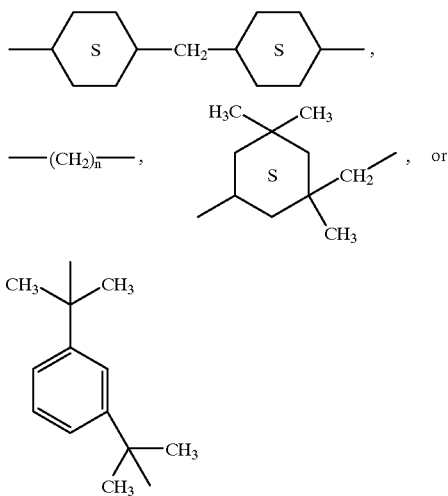

and where n=more than 1 and preferably 6. In an important aspect of the invention, the $R_{12}$ radical is trifunctional such as

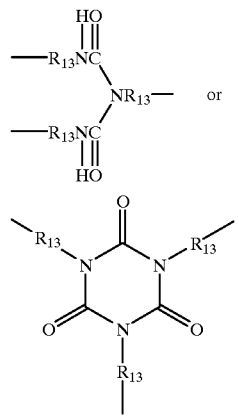

where $R_{13}$ is a difunctional radical as described above.

The phenolic ester alcohol is the reaction product of a phenol carboxylic acid and an epoxy compound. In an important aspect, the phenolic ester alcohol is represented by the general formula "C" wherein $R_4$ through $R_7$ is defined above.

A phenol carboxylic acid reactant to make the phenolic ester alcohol may be used to prepare the phenolic ester reaction product of formula C. The phenol carboxylic acid has the general formula:

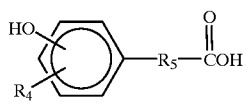

wherein $R_4$ and $R_5$ are as described above. Examples of suitable phenol carboxylic acids include hydroxybenzoic acids, acids where $R_5$ is alkylene such as phenyl acetic acid, hydroxy phenyl propionic acid, hydroxyphenyl stearic acid, and acids where in $R_5$ encompasses additional phenol functionality such as 4,4-bis hydroxyphenyl pentanoic acid and the like. In a preferred embodiment of the invention, $R_4$ in formula A is hydrogen, $R_5$ is a direct bond, $R_6$ is hydrogen and $R_7$ is $CH_2OH$, a hydrocarbon moiety or an organic moiety containing ester or ether groups and containing from 1 to about 20 carbon atoms, more preferably from about 3 to 20 carbon atoms.

In an important aspect of the invention, the phenolic ester alcohol used to make the phenol blocked isocyanate is the ester reaction product of a hydroxybenzoic acid and an epoxy compound. Suitable hydroxybenzoic acids include ortho-hydroxybenzoic acid (salicylic acid), meta-hydroxybenzoic acid and para-hydroxybenzoic acid (PHBA), with para-hydroxybenzoic acid being most preferred.

The epoxy compound may be selected from the group consisting of glycidyl esters, glycidyl alcohols, glycidyl ethers, linear epoxies and aromatic epoxies. These include glycidol, glycidyl ethers of the structure:

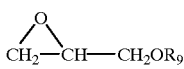

glycidyl esters of the structure:

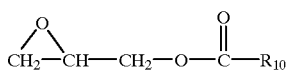

glycidyl or oxirane compounds having the structure:

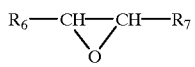

and cycloaliphatic epoxy compounds having the structures:

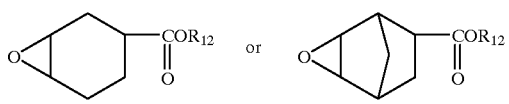

wherein $R_{12}$ is an organic radical having 1–12 carbon atoms which can include ether, ester, hydroxyl or epoxy groups, as well as other cycloaliphatic compounds having the structures:

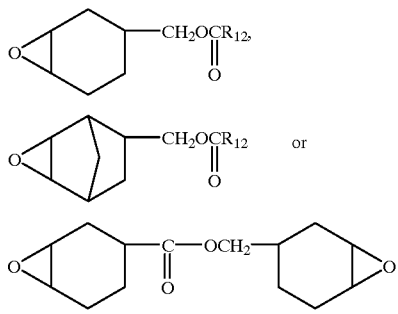

Other epoxy materials include epoxidized alpha-olefins and bis aromatic epoxies such as the reaction product of bisphenol A or F with epichlorohydrin.

Suitable epoxy compounds particularly include monoepoxides containing a terminal glycidyl group or polyepoxides containing internal oxirane or glycidyl groups or terminal glycidyl groups. Suitable epoxy compounds include glycidyl acrylate or methacrylate monomers, alkyl glycidyl ether monomers, and low molecular weight copolymers of one or more of these monomers with one or more ethylenically unsaturated monomers such as acrylates, methacrylates, vinyl aromatic monomers and the like.

Other suitable epoxy compounds include the ester reaction products of epichlorohydrin with mono- or dibasic aliphatic or aromatic carboxylic acids or anhydrides containing from about 1 to 20 carbon atoms. Inclusive of such acids are aliphatic acids such as acetic, butyric, isobutyric, lauric, stearic, maleic and myristic acids and aromatic acids such as benzoic, phthalic, isophthalic and terephthalic acids as well as the corresponding anhydrides of such acids. Preferred such acids are primary, secondary or tertiary aliphatic carboxylic acids containing from 5 to 13 carbon atoms. In a very important aspect of the invention, an epoxy compound of this type is the glycidyl ester of a mixed aliphatic, mostly tertiary, mono carboxylic acid with an average of 9 to 11 carbon atoms such as available from Exxon Chemical Co., under the trade name GLYDEXX® or from Shell Chemical Co., under the trade name CARDURA® E ester. These may be represented by the general formula "D". (Glydexx® general formula).

Still other epoxy compounds include glycidyl ether reaction products of epihalohydrin with aliphatic or aromatic alcohols or polyols containing from about 1 to 20 carbon atoms. Suitable alcohols include aromatic alcohols such as bisphenol, bisphenol A, bisphenol F, phenolphthalein and novolac resins; aliphatic alcohols such as ethanol, isopropanol, isobutyl alcohol, hexanol, stearyl alcohol and the like; and aliphatic polyols such as ethylene glycol, propylene glycol and butylene glycol.

Other epoxy compounds which may be used include the mono-epoxides of $C_8$ to $C_{20}$ alpha mono-olefins.

The epoxy compound may also comprise epoxidized fatty compounds. Such epoxidized fatty compounds include epoxidized fatty oils, epoxidized fatty acid esters of monohydric alcohols, epoxidized fatty acid esters of polyhydric alcohols, epoxidized fatty nitriles, epoxidized fatty amides, epoxidized fatty amines and epoxidized fatty alcohols. Suitable alicyclic epoxide and polyepoxide materials include dicyclopentadiene diepoxide, limonene diepoxide, and the like. Additional useful epoxides include for example, vinyl cyclohexane dioxide, bis (3,4-epoxycyclohexyl) adipate, 3,4-epoxycyclohexylmethyl-3,4-epoxy-cyclohexane carboxylate and 2-(3,4-epoxycyclohexyl-5,5-spiro-3,4-epoxy) cyclohexane-metadioxane.

In a very important aspect of making the phenolic ester alcohol used to make the phenol blocked isocyanate, the hydroxybenzoic acid/epoxy reaction product of this invention may be formed by reacting the hydroxybenzoic acid and the epoxy compound to provide a phenolic ester alcohol with one aliphatic hydroxyl group, optionally in a solvent therefor, at a temperature ranging from about 90° to about 120° C. to initiate such reaction. Once the reaction is initiated, such reaction is exothermic, and the reaction temperature can rise to a temperature of about 150° to 175° C. usually without application of external heat. The reaction temperature then is maintained at about 150° C. to 170° C. (and preferably less than about 200° C.) until the reaction has been determined to be substantially complete.

Reaction products of reduced discoloration can be produced by control of the maximum temperature of the exothermic reaction. This can be achieved by a staged and/or incremental addition of one of the reactants, e.g. the epoxy reactant, so that the reaction temperature is maintained at a temperature of about 150° C. or below. The remainder of that reactant may then be added in stages or continuously while maintaining the reaction temperature below about 150° C. This process modification gives rise to reaction products having lower Color Index values.

Approximately stoichiometric quantities of the epoxy compound and the phenol carboxylic acid are used in the reaction, although a slight molar excess of epoxy may be necessary to drive the reaction to completion.

The phenol blocked isocyanate is the reaction product of the phenolic ester alcohol, such as the one shown in formula C, and a composition having a polyisocyanate functionality, such as a polyisocyanate, biuret or isocyanurate. One equivalent isocyanate is reacted for every equivalent of phenolic hydroxyl group in the phenolic ester alcohol. Although the reaction can be made to proceed at elevated temperature without a catalyst, in an important aspect, the reaction is catalyzed by a tertiary amine catalyst which in a particularly important aspect is 1,4-diazabicyclo[2.2.2] octane (DABCO). Tertiary amine catalysts which also may be used include: triethylene diamine (available as DABCO Crystalline); the amine salt of the reaction triethylene diamine and an organic carboxylic acid (commercially available as DABCO 8154); bis (N,N dimethylaminoethyl) ether (available as DABCO BL-19); N-cetyl, N,N-dimethylamine (available as DABCO B-16); N,N' dimethylethanolamine (DABCO DMEA); 2-methyl-1,4-diaza (2.2.2)-bicyclo-octane (DABCO M); N-CoCo morpholine (DABCO NCM); N-ethyl morpholine (DABCO NEM); N-methyl morpholine (DABCO NMM); N,N' dimethylaminoethyl N, methyl ethanolamine (DABCO T); N,N-dimethylaminoethyl morpholine (DABCO XDM); N,N,N', N' tetramethyl-n-hexyl diamine (KAO LIZER #1); N,N,N'N' tetramethyl-1,3-butane diamine (NIAX TMBDA); Pentamethyl-diethylene triamine (POLYCAT 5); Quinuclidine (1,4-ethylene piperidine) (QUINCAT); and N,N-dimorpholinodiethyl ether (TEXACAT DMDEE).

The phenol blocked isocyanate of the invention may be made with low molecular weight diisocyanates such as hexamethlenediisocyanate (HDI) as well as polyisocyanates which have molecular weights up to about 20,000. Unblocked di- or polyisocyanates, unblocked biurets and unblocked isocyanurates all may be reacted with the phenolic hydroxyls of the phenolic ester to form carbamate linkages [—OC(=O)N(—H)—] and the phenol blocked isocyanate having aliphatic hydroxyls. The resulting blocked isocyanate at low molecular weights serves as a hardener to harden the coating binder without substantially increasing the viscosities of the formulated coating composition and polymeric vehicle. An example of such a phenol blocked isocyanate is 2-hydroxyethyl salicylate blocking HDI which has a molecular weight of about 132.

Diisocyanates which may be used in the invention additional to HDI include isophorone diisocyanate (IPDI), tetramethylxylene diisocyanate (TMXDI), and other aliphatic diisocyanates such as trimethylene diisocyanate, tetramethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate; cycloalkylene diisocyanates such as 1,3-cyclopentane-diisocyanate, 1,4-cyclohexane-diisocyanate and 1,3-cyclohexane-diisocyanate; and aromatic diisocyanates such as m-phenylene diisocyanate, p-phenylene diisocyanate, 4,4'-diphenyldiisocyanate, 1,5-naphthalene diisocyanate, 4,4'-diphenylmethane diisocyanate, 2,4- or 2,6-tolulene diisocyanate.

The polyisocyanates which may be used may be dimerized, such as uretdiones or trimerized diisocyanates such as trimerized HDI or IPDI and triisocyanates such as triphenylmethane-4,4',4"-triisocyanate, 1,3,5-triisocyanatobenzene, 1,3,5-triisocyanatocyclohexane, 2,4,6-triisocyanatotoluene and ω-isocyanatoethyl-2,6-diisocyanatocaproate; and tetraisocyanates, such as 4,4'-diphenyldimethylmethane-2,2',5,5'-tetraisocyanate.

They also may be polymers or copolymers with vinyl monomers of isocyanate functional monomers such as

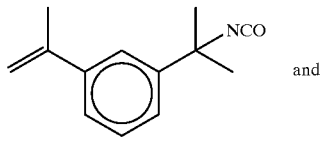

and

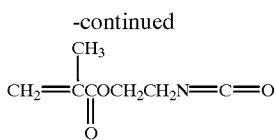

In another aspect of the invention, unblocked biurets such as the biuret of hexamethylene diisocyanate (HDI) which biuret has the structure

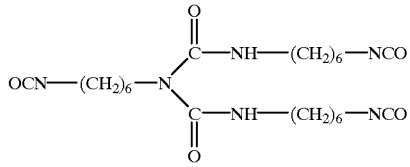

and is a trimerized product of hexamethylene diisocyanate and water may be used in lieu of polyisocyanates.

In a particularly important aspect of the invention an isocyanate, biuret, isocyanurate or blends thereof with an —N=C=O functionality of about 3 provides a particularly useful phenol blocked isocyanate when reacted with a phenolic ester alcohol which is a reaction product of a hydroxybenzoic acid such as PHBA and glycidyl ester of a mixed aliphatic such as Glydexx®.

The Crosslinking Agent

The crosslinking agent which is used with the phenol blocked isocyanate may be one or more additional isocyanate compounds. Although the isocyanate used to make the phenol blocked isocyanate of the invention should be unblocked, isocyanate compounds which may serve as crosslinkers can be unblocked or blocked polyisocyanates, one or more unblocked or blocked biurets, and one or more blocked or unblocked isocyanurates. The crosslinking agent also can be one or more amino resin and/or a blend of crosslinkers at least one crosslinker in the blend having the —N=C=O functionality and one crosslinker in the blend being an amino resin crosslinker. Resins with polyepoxy functionality also may be used as a crosslinking agent.

Effective amounts of crosslinker for permitting the polymeric vehicle to crosslink into a coating binder with the hardness and impact resistance as described above are used. When the polymeric vehicle includes a polyol and the phenol blocked isocyanate of the invention, the polymeric vehicle generally comprises at least about 15 weight percent polyol and generally from about 15 to about 60 weight percent polyol, from about 10 to about 80 weight percent phenol blocked isocyanate of the invention and from about 8 to about 50 weight percent crosslinker where the crosslinker is an amino resin and from about 8 to about 50 weight percent crosslinker where the crosslinker has an isocyanate functionality.

The same polyisocyanates, biurets and isocyanurates may be used as crosslinkers that are used to make the phenol blocked isocyanate. If, however, a compound which is high in isocyanate functionality (numerous isocyanate groups) is used to make the phenol blocked isocyanate, then a compound which is lower in isocyanate functionality should be used as a crosslinker.

Agents which block the isocyanate groups and "deblock" at elevated temperature are known and are used in the invention. These include oximes, lactams, imines, carbamates such as acetone oxime, methyl ethyl ketoxime, and ε-caprolactam.

Methylol (alkoxymethyl) amino crosslinking agents are suitable for use in the present invention and are well known commercial products, and are generally made by the reaction of di (poly) amide (amine) compounds with formaldehyde and, optionally, a lower alcohol.

Examples of suitable amino-crosslinking resins include one or a mixture of the following materials:

Melamine based resins

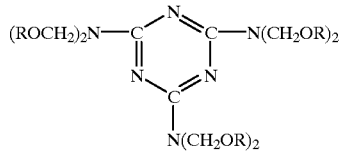

wherein R is the following:
R=CH$_3$ (Cymel)® 300, 301, 303);
R=CH$_3$, C$_2$H$_5$ (Cymel® 1116);
R=CH$_3$, C$_4$H$_9$ (Cymel® 1130, 1133);
R=C$_4$H$_9$ (Cymel® 1156); or
R=CH$_3$, H (Cymel® 370, 373, 380, 385).

The preferred melamine is hexamethoxymethyl melamine.

Benzoguanamine based resins

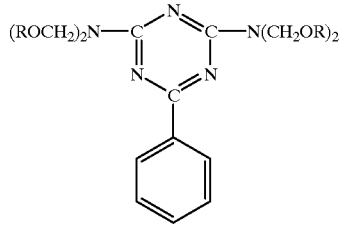

wherein R=CH$_3$, C$_2$H$_5$ (Cymel® 1123).

Urea based resins

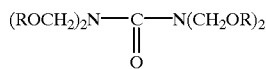

wherein:
R=CH$_3$, H (Beetle@ 60, Beetle@ 65); or
R=C$_4$H$_9$ (Beetle@ 80).

Gycoluryl based resins

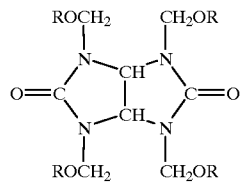

wherein:
R=CH$_3$, C$_2$H$_5$ (Cymel® 1171); or
R=C$_4$H$_9$ (Cymel® 1170).

Epoxy Resin Crosslinkers

Epoxy resins having polyepoxy functionality of at least about 2 may be used as crosslinking agents. Generally, these crosslinking agents will have a molecular weight in the range of from about 200 to about 6,000, should not have hydroxyl functionality (whereas an epoxy as the polyol component should have such hydroxyl functionality) and may be the condensation product of epichlorohydrin of resorcinol, hydroquinone, glycols and glycerol.

The Polyols In The Polymeric Vehicle

The polyols which are used in the invention are selected from the group consisting of polyesters, alkyd polymers, acrylic polymers and epoxy polymers. The polyols have an number average molecular weight (M$_n$) of at least about 200, and may generally range from about 200 up to about 20,000, more preferably from about 280 up to about 10,000, and most preferably from about 300 up to about 3,000 to 6,000. The glass transition temperature (Tg) of these materials may generally range from as low as −90° C. up to +100° C. or higher.

The diesters and polyesters may be prepared by well known condensation processes using a molar excess of diol. Preferably the molar ratio of diol to dicarboxylic acid is p+1:p wherein p represents the number of moles of dicarboxylic acid. The reaction may be conducted in the absence of or presence of a suitable polycondensation catalyst as is known in the art.

Polyesters also can be made from carboxylic acids and oxiranes, such as

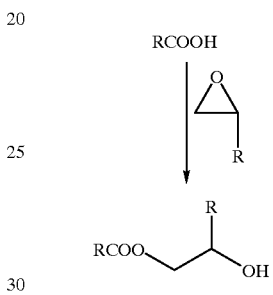

R=H, alkyl, aryl

Some preferred examples of the diols used to make the polyester polyols are one or more of the following: neopentyl glycol; ethylene glycol; hexamethylenediol; 1,2-cyclohexanedimethanol; 1,3-cyclohexanedimethanol; 1,4-cyclohexanedimethanol; diethylene glycol; triethylene glycol; tetraethylene glycol; dipropylene glycol; polypropylene glycol; hexylene glycol; 2-methyl-2-ethyl-1,3-propanediol; 2-ethyl-1,3-hexandediol; 1,5-pentanediol; thiodiglycol; 1,3-propanediol; 1,2-propanediol; 1,2-butanediol; 1,3-butanediol; 2,3-butanediol; 1,4-butanediol; 2,2,4-trimethyl-1,3-pentanediol; 1,2-cyclohexanediol; 1,3-cyclohexanediol; 1,4-cyclohexanediol; neopentyl diol hydroxy methyl isobutyrate, and mixtures thereof. Examples of polyols include triols such as glycerine, timethylol ethane, trimethylol propane, pentaerythritol and the like.

The diols are reacted with carboxyl groups to make the polyesters. The carboxyl groups may be present in the form of anhydride groups, lactone groups, or equivalent ester forming derivatives such as the acid halide or methyl ester. The dicarboxylic acids or derivatives are preferably one or more of the following: phthalic anhydride, terephthalic acid, isophthalic acid, naphthalene dicarboxylic acids, adipic acid, succinic acid, glutaric acid, fumaric acid, maleic acid, cyclohexane dicarboxylic acid, azeleic acid, sebasic acid, dimer acid, caprolactone, propiolactone, pyromellitic dianhydride, substituted maleic and fumaric acids such as citraconic, chloromaleic, mesaconic, and substituted succinic acids such as aconitic and itaconic, and mixtures thereof. Many commercially available polyesters are produced using a combination of aromatic and aliphatic dicarboxylic acids or a combination of cycloaliphatic and aliphatic dicarboxylic acids or combinations of all three types. However, where polyesters having low viscosity and low solvent content are desired, the most preferred acids used for the purposes of this invention are linear saturated or unsaturated aliphatic dicarboxylic acids having from 2 to 10 carbon atoms such as succinic, glutaric, adipic, and similar materials.

The acrylic polymers which may be used as the polyol component in the present invention are acrylic copolymer resins. The acrylic copolymer resin is prepared from at least one hydroxy-substituted alkyl (meth) acrylate and at least one non-hydroxy-substituted alkyl (meth) acrylate. The hydroxy-substituted alkyl (meth) acrylates which can be employed as monomers comprise members selected from the group consisting of the following esters of acrylic or methacrylic acid and aliphatic glycols: 2-hydroxyethyl acrylate, 3-chloro-2-hydroxypropyl acrylate; 1-hydroxy-2-acryloxy propane; 2-hydroxypropyl acrylate; 3-hydroxypropylacrylate; 2,3-dihydroxypropylacrylate; 3-hydroxybutyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 1-hydroxy-2-methacryloxy propane; 2-hydroxypropyl methacrylate; 2,2-dihydroxypropyl methacrylate; 2-hydroxybutyl methacrylate; 3-hydroxybutyl methacrylate; 2-hydroxyethyl methacrylate; 4-hydroxybutylmeth-acrylate; 3,4-dihydroxybutyl methacrylate; 5-hydroxy-pentyl methacrylate; and 7-hydroxyheptyl methacrylate. The preferred hydroxy functional monomers for use in preparing the acrylic resins are hydroxy-substituted alkyl (meth) acrylates having a total of 5 to 7 carbon atoms, i.e., esters of $C_2$ to $C_3$ dihydric alcohols and acrylic or methacrylic acids. Illustrative of particularly suitable hydroxy-substituted alkyl (meth) acrylate monomers are 2-hydroxyethyl methacrylate, 2-hydroxyethyl acrylate, 2-hydroxybutyl acrylate, 2-hydroxypropyl methacrylate, and 2-hydroxypropyl acrylate.

Among the non-hydroxy-substituted alkyl (meth) acrylate monomers which may be employed are alkyl (meth) acrylates. Preferred nonhydroxy unsaturated monomers are esters of $C_1$ to $C_{12}$ monohydric alcohols and acrylic or methacrylic acids, e.g., methyl methacrylate, hexyl acrylate, 2-ethylhexyl acrylate, lauryl methacrylate, glycidyl methacrylate, etc. Examples of particularly suitable monomers are butyl acrylate, butyl methacrylate and methyl methacrylate.

Additionally, the acrylic copolymer polyol resins used in the present invention may include in their composition other monomers such as acrylic acid and methacrylic acid, monovinyl aromatic hydrocarbons containing from 8 to 12 carbon atoms (including styrene, alpha-methyl styrene, vinyl toluene, t-butyl styrene, chlorostyrene and the like), vinyl chloride, vinylidene chloride, acrylonitrile, epoxy-modified acrylics and methacrylonitrile.

The acrylic copolymer polyol preferably has a number average molecular weight not greater than about 30,000, more preferably between about 280 and about 15,000, and most preferably between about 500 and about 5000.

Alkyd polymers may be used as the polyol component of this invention. These alkyd resins have a number average molecular weight in the range of from about 500 to about 20,000, are oil modified polyester resins and are broadly the product of the reaction of a dihydric alcohol and a dicarboxylic acid or acid derivative and an oil, fat or carboxylic acid derived from such oil or fat which acts as a modifier. Such modifiers are drying oils, semi-drying oils or non-drying oils. The polyhydric alcohol employed is suitably an aliphatic alcohol, and mixtures of the alcohols also may be employed. The dicarboxylic acid, or corresponding anhydrides, may be selected from a variety of aliphatic carboxylic acids or mixtures of aliphatic and aromatic dicarboxylic acids. Suitable acids and acid anhydrides include, by way of example, succinic acid, adipic acid, phthalic anhydride, isophthalic acid, trimellitic acid (anhydride) and bis 3,3', 4,4'-benzophenone tetracar-boxylic anhydride. Mixtures of these acids and anhydrides may be employed to produce a balance of properties. As the drying oil or fatty acid there is suitably employed a saturated or unsaturated fatty acid of 12 to 22 carbon atoms or a corresponding triglyceride, that is, a corresponding fat or oil, such as those contained in animal or vegetable fats or oils. Suitable fats and oils include tall oil, castor oil, coconut oil, lard, linseed oil, palm oil, peanut oil, rapeseed oil, soybean oil and beef tallow. Such fats and oils comprise mixed triglycerides of such fatty acids as caprylic, capric, lauric, myristic, palmitic, and stearic and such unsaturated fatty acids as oleic, eracic, ricinoleic, linoleic and linolenic. Chemically, these fats and oils are usually mixtures of two or more members of the class. Alkyd resins made with saturated monocarboxylic acids and fats are preferable where improved weather resistance is of prime concern.

Epoxy polymers having a number average molecular weight in the range of from about 500 to about 6,000 may be used as the polyol component of this invention.

A well known epoxy resin having hydroxyl functionality which may be used in the invention is made by condensing epichlorohydrin with bisphenol A, diphenylol propane. An excess of epichlorohydrin is used, to leave epoxy groups on each end of the low-molecular weight polymer:

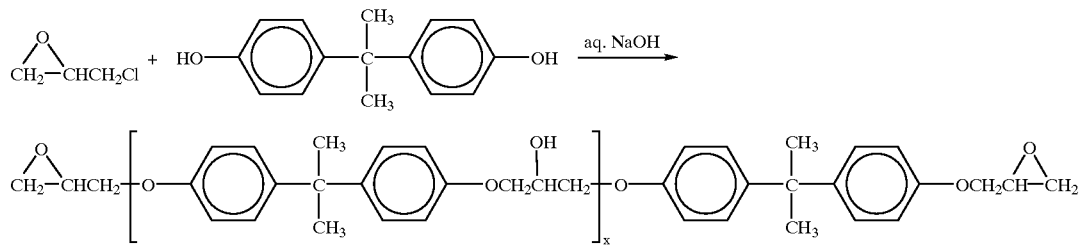

The viscosity of the polymer is a function of molecular weight, the higher the molecular weight the more viscous the polymer.

Other hydroxyl-containing compounds, including resorcinol, hydroquinone, glycols, and glycerol may be used in lieu of bisphenol A.

Solvents And Optional Ingredients In the Polymeric Vehicle

There are different aspects of the invention which include a polymeric vehicle effective for providing a formulated coating composition which is without any added organic solvent or at least does not have more than about 3 weight percent organic solvent, a polymeric vehicle which is effective for providing a high solids, low VOC formulated coating composition and a water-thinned formulated coating composition. Suitable optional solvents which may be included in the curable compositions of the invention comprise toluene, xylene, ethylbenzene, tetralin, naphthalene, and solvents which are narrow cut aromatic solvents comprising $C_8$ to $C_{13}$ aromatics such as those marketed by Exxon Chemical Company under the name Aromatic 100, Aromatic 150, and Aromatic 200.

Other suitable solvents include acetone, methyl ethyl ketone, methyl isobutyl ketone, methyl amyl ketone, methyl isoamyl ketone, methyl heptyl ketone, isophorone, isopropanol, n-butanol, sec.-butanol, isobutanol, amyl alcohol, isoamyl alcohol, hexanols, and heptanols.

Suitable oxygenated solvents include propylene glycol monomethyl ether acetate, propylene glycol propyl ether acetate, ethyl ethoxypropionate, dipropylene glycol monomethyl ether acetate, propylene glycol monomethyl ether, and like materials. Other such solvents include alkyl esters such as ethyl acetate, n-propyl acetate, butyl acetate, amyl acetate, mixtures of hexyl acetates such as sold by Exxon Chemical Company under the name EXXATE® 600 and mixtures of heptyl acetates sold under the name EXXATE® 700. The list should not be considered as limiting, but rather as examples of solvents which are useful in the present invention. The type and concentration of solvents are generally selected to obtain formulation viscosities and evaporation rates suitable for the application and baking of the coatings.

Suitable pigments which may be included in the compositions of this invention are those opacifying pigments normally used in paint and coating formulations and include titanium dioxide, zirconium oxide, zircon, zinc oxide, iron oxides, antimony oxide, carbon black, as well as chrome yellows, greens, oranges, mixed metal oxides, ceramic pigments and the like. Preferred pigments include rutile $TiO_2$ and particularly weather-resistant coated types of $TiO_2$. The pigments may also be blended with a suitable extender material which does not contribute significantly to hiding power. Suitable extenders include silica, barytes, calcium sulfate, magnesium silicate (talc), aluminum oxide, aluminum hydroxide, aluminum silicate, calcium silicate, calcium carbonate (mica), potassium aluminum silicate and other clays or clay-like materials.

Satisfactory baking schedules for formulations of the present invention vary widely including, but not limited to, low temperature bakes of about 20 to 30 minutes at temperatures between 90° C. and 105° C. for large equipment applications and high temperature bakes of about 5 to 10 seconds in 300° C. to 375° C. air for coil coating applications. In general, the substrate and coating should be baked at a sufficiently high temperature for a sufficiently long time so that essentially all solvents are evaporated from the film and chemical reactions between the polymer and the crosslinking agent proceed to the desired degree of completion. The desired degree of completion also varies widely and depends on the particular combination of cured film properties required for a given application. Further, catalyzed crosslinking also may be effected at ambient temperatures using many isocyanate-type crosslinkers.

Acid catalysts may be used to cure systems containing hexamethoxymethyl melamine and other amino crosslinking agents, and a variety of suitable acid catalysts are known to one skilled in the art for this purpose. These include, for example, p-toluene sulfonic acid, methane sulfonic acid, nonylbenzene sulfonic acid, dinonylnapthalene disulfonic acid, dodecylbenzene sulfonic acid, phosphoric acid, phosphorous acid, phenyl acid phosphate, butyl phosphate, butyl maleate, and the like or a compatible mixture of them. These acid catalysts may be used in their neat, unblocked form or combined with suitable blocking agents such as amines. Typical examples of unblocked catalysts are the King Industries, Inc., products with the tradename K-CURE®. Examples of blocked catalysts are the King Industries, Inc., products with the tradename NACURE®.

Catalysts for isocyanates include soluble tin salts such as dibutyltin dilaurate and dibutyltin diacetate, divalent zinc salts such as zinc diacetate, and tertiary bases including tertiary amines, such as diazabicyclooctane.

The amount of catalyst employed typically varies inversely with the severity of the baking schedule. In particular, smaller concentrations of catalysts are usually required for higher baking temperatures or longer baking times. Typical catalyst concentrations for moderate baking conditions (15 to 30 minutes at 150° C.) would be about 0.2 to 0.5 wt % catalyst solids per polymer plus crosslinking agent solids. Higher concentrations of catalyst up to about 2 wt % may be employed for cures at lower temperature or shorter times. Formulations containing sufficient residual esterification catalyst, such as phosphorous acid, may not require the inclusion of any additional crosslinking catalyst to effect a proper cure at lower curing temperatures.

Transcarbonoylation Reactions of the Phenol Blocked Isocyanates of the Invention The phenol blocked isocyanate of the invention may be thermally unblocked to give free isocyanate or it may be rearranged such that the isocyanate may be unblocked from the phenyl ring of the phenolic alcohol and reattached to a aliphatic hydroxyl of the phenolic alcohol in what is called a transcarbonolyation reaction. The speed of this reaction is enhanced by use of a catalyst such as a tin catalyst which is a soluble tin salt such as dibutyl tin dilaurate and dibutyl tin acetate and divalent zinc salts such as zinc diacetate.

An example of a rearrangement is the rearrangement of compound 1 to the structure of the compound 3 below

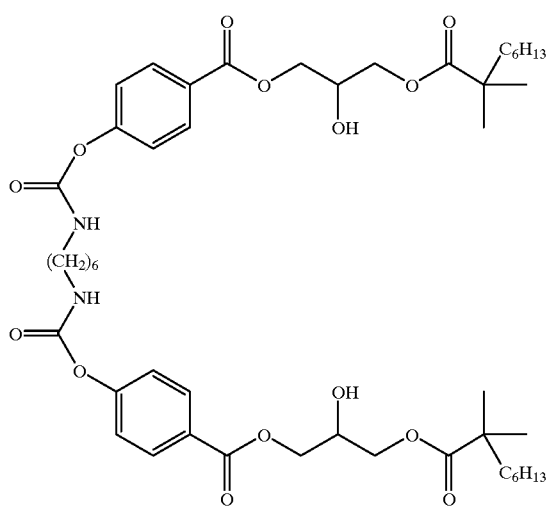

1

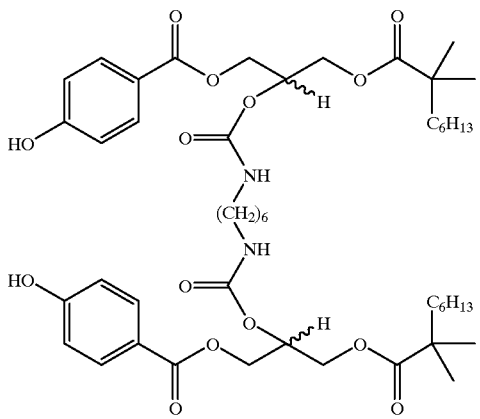

3

A particularly useful aspect of the invention is the use of a transcarbonoylation of a phenol blocked trifunctional isocyanate such as compound 2. Compound 2 may be mixed with an epoxy crosslinker, which mixture is a stable blend in view of the phenol hydroxyls on the phenolic alcohol being blocked. When the blend is heated, the phenolic blocked isocyanate is rearranged such that the phenol is liberated and the isocyanate is moved to the aliphatic hydroxyls leaving a trifunctional phenol having the structure

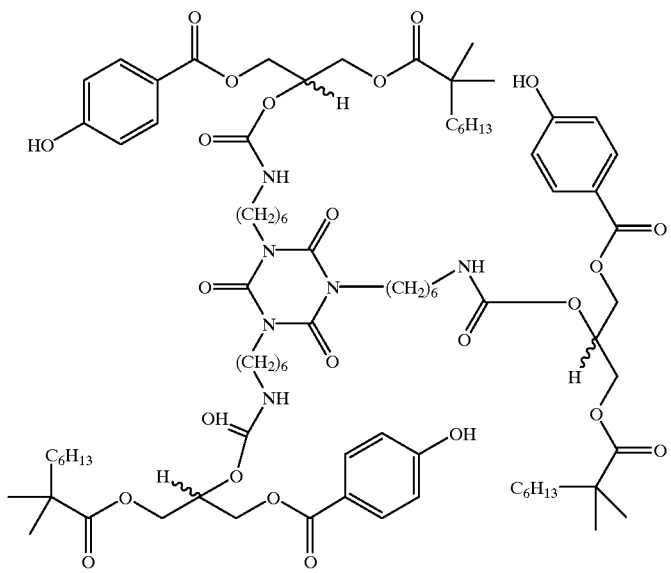

The phenolic hydroxyls on the rearranged structure above are highly reactive with the epoxy resin to provide a highly crosslinked network for a coating.

The following examples set forth compositions according to the invention and how to practice the invention.

EXAMPLE I

Amine Catalyzed Reactions

Reaction of PHEA with HDI (2:1 molar ratio)

Into a 25-mL round-bottomed flask equipped with a magnetic stirrer, was placed a solution of PHEA (PHBA+ Glydexx) (5.03 g, 0.014 mol)

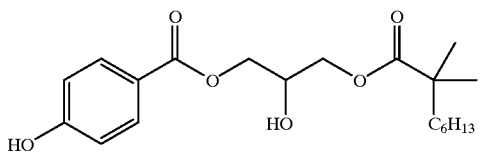

and DABCO (diazabicyclo[2.2.2] octane, 0.03 g, 0.5 wt. % total) in 5 mL ethyl acetate. A solution of HDI (hexamethylene diisocyanate 1.14 g, 6.79 mmol) in 5 mL ethyl acetate was also added, and the solution was stirred at room temperature four days until the isocyanate band at 2256 cm$^{-1}$ in the infrared spectrum had become very weak. The solution was poured into an aluminum pan and the solvent was allowed to evaporate overnight in a stream of air. A colorless resinous residue was obtained. Based on $^{13}$C NMR analysis, the reaction product had the following structure.

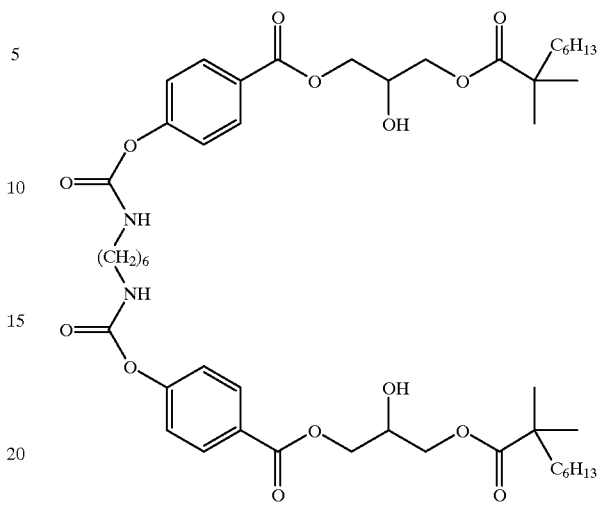

1

Reaction of PHEA with HDI (1:1 molar ratio)

The procedure was similar to the one discussed above. The quantities of the reagents are: PHEA of the first part of this Example (5.50 g, 0.014 mol), DABCO (0.04 g, 0.5 wt. % total), HDI (2.32 g, 0.014 mol). The isocyanate band at 2260–2280 cm$^{-1}$ was diminished considerably but was still present even after stirring at room temperature for four days. A colorless resinous residue was obtained.

Reaction of PHEA with HDI Isocyanurate (3:1 Molar Ratio)

The procedure was similar to the one discussed above. The quantities of the reagents are: PHEA (5.02 g, 0.014 mol) and DABCO (0.03 g, 0.4 wt. % total), HDI Isocyanurate (Desmodur N3300, 2.31 g, 0.014 mol). Acetonitrile was used as the solvent. A colorless, resinous product was obtained. Based on $^{13}$CNMR analysis, the reaction product had the following structure.

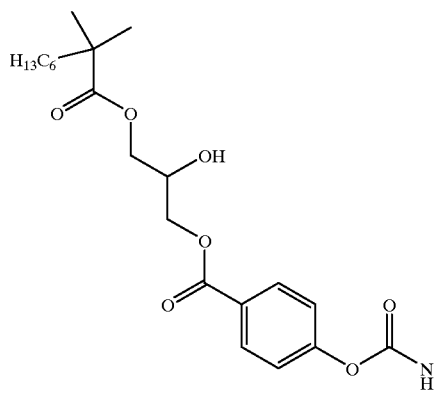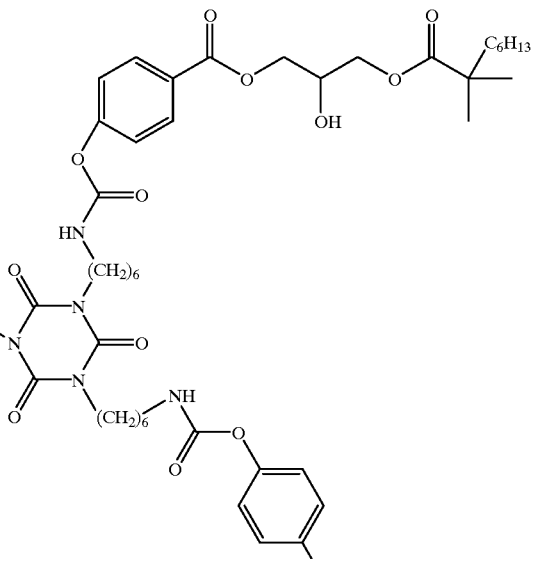

2

-continued

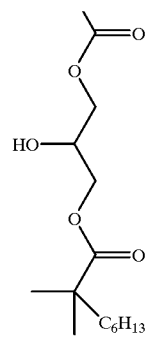

What is claimed is:

1. A compound having blocked isocyanate functionality, the compound having the blocked isocyanate functionality being formed by reacting a blend of a compound having an average isocyanate functionality of from about 1 to about 4 isocyanate groups per molecule and a phenolic ester alcohol having at least one aliphatic hydroxyl group and at least one phenolic hydroxyl group, the compound having isocyanate functionality reacting with the phenolic hydroxy group of the phenolic ester alcohol, the compound with the isocyanate functionality being blocked with a phenolic blocking group from the phenolic ester alcohol, the isocyanate functionality being blocked with the phenolic blocking group through the phenolic oxygen on a phenyl ring of the phenolic blocking group, wherein the phenolic blocking group has the general formula

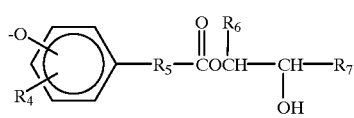

wherein $R_4$ is selected from the group consisting of hydrogen, halogen, hydroxyl, $C_1$ to $C_8$ alkyl and $C_1$ to $C_8$ alkoxy, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, $R_6$ is selected from the group consisting of hydrogen, a $C_1$ to $C_{20}$ organic radical, and a $C_1$ to $C_{20}$ organic radical which includes in its structure at least one ester linkage or a direct bond which forms with $R_7$ part of a 5 or 6 carbon atom cyclic ring structure, $R_7$ is $CH_2R_8$ wherein $R_8$ is selected from the group consisting of hydroxy, $OR_9$,

and $R_{11}$, wherein $R_9$ is selected from the group consisting of a primary or secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_{10}$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms, and combinations thereof, wherein the primary, secondary and tertiary aliphatic groups include at least one ester linkage; and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, and combinations thereof, the phenolic blocking group after the reaction having its at least one aliphatic hydroxyl group unreacted with the compound having isocyanate functionality.

2. A compound having blocked isocyanate functionality as recited in claim 1 wherein the phenolic blocking group has at least two ester groups.

3. A compound having blocked isocyanate functionality as recited in claim 1 wherein the compound has a general formula

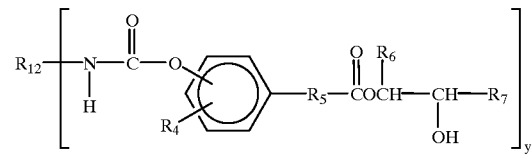

wherein y is 1 to 4, wherein $R_{12}$ is a residue of a multifunctional isocyanate compound.

4. A compound having blocked isocyanate functionality as recited in claim 3 where $R_{12}$ is selected from the group consisting of

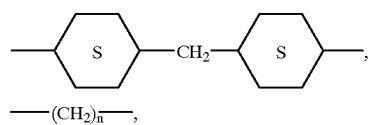

-continued

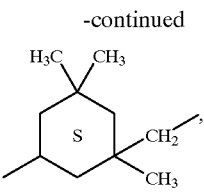

and

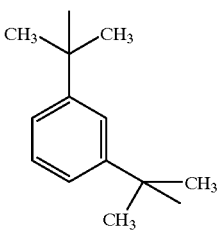

wherein n is greater than 1.

5. A compound having blocked isocyanate functionality as recited in claim 3 wherein $R_{12}$ is selected from the group consisting of

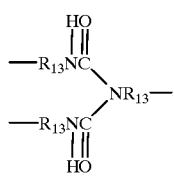

and

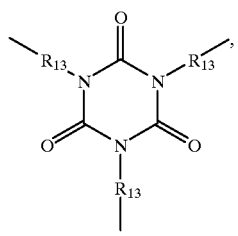

and $R_{13}$ is a difunctional radical selected from the group consisting of

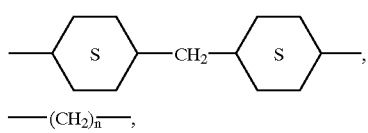

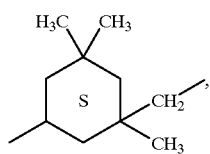

-continued

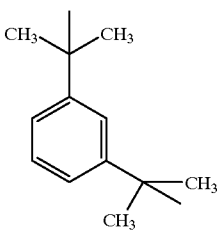

wherein n is greater than 1.

6. A polymeric vehicle comprising:
a polyol selected from the group consisting of a polyester polyol, an alkyd polymer polyol, an acrylic polymer polyol, an epoxy polymer polyol and mixtures thereof; and
a phenol blocked isocyanate,
the phenol blocked isocyanate being the reaction product of a compound having an average isocyanate functionality of from about 1.9 to about 20 isocyanate groups per molecule and a phenolic ester alcohol having at least one aliphatic hydroxyl group and at least one phenolic hydroxyl group wherein about one equivalent of isocyanate is reacted with about every equivalent of phenolic hydroxyl group which is a part of the phenolic ester alcohol, the compound having the isocyanate functionality and the phenolic ester alcohol forming a reaction mixture, the compound having isocyanate functionality reacting with the phenolic hydroxy group of the phenolic ester alcohol, the phenolic ester alcohol forming a phenolic blocking group which blocks the isocyanate functionality,
wherein the phenolic ester alcohol has at least two ester groups and has the general formula

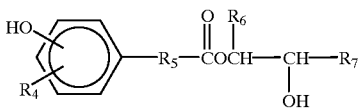

wherein $R_4$ is selected from the group consisting of hydrogen, halogen, hydroxyl, $C_1$ to $C_8$ alkyl and $C_1$ to $C_8$ alkoxy, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, $R_6$ is selected from the group consisting of hydrogen, a $C_1$ to $C_{20}$ organic radical, and a $C_1$ to $C_{20}$ organic radical which includes in its structure at least one ester linkage or a direct bond which forms with $R_7$ part of a 5 or 6 carbon atom cyclic ring structure, $R_7$ is $CH_2R_8$ wherein $R_8$ is selected from the group consisting of hydroxy, $OR_9$,

and $R_{11}$, wherein $R_9$ is selected from the group consisting of a primary or secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_{10}$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms, and combinations thereof, wherein the primary, secondary and tertiary aliphatic groups include at least one ester linkage; and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, and combinations thereof, the phenolic blocking group after the reaction having its at least one aliphatic hydroxyl group unreacted with the compound having isocyanate functionality.

7. The polymeric vehicle as recited in claim 6, wherein the polyol is a polyester polymer having a number average molecular weight in the range of from about 200 to about 20,000.

8. The polymeric vehicle as recited in claim 6, wherein the polyol is an acrylic polymer having a number average molecular weight in the range of from about 500 to about 5,000.

9. The polymeric vehicle as recited in claim 6, wherein the polyol is an alkyd polymer having a number average molecular weight in the range of from about 500 to about 20,000.

10. The polymeric vehicle as recited in claim 6, wherein the polyol is an epoxy polymer having a number average molecular weight in the range of from about 500 to about 6,000.

11. The polymeric vehicle as recited in claim 6, wherein the polyol is a polyester polyol having number average molecular weight of from about 200 to about 20,000 and wherein the phenol blocked isocyanate has a number average molecular weight in the range of from about 500 to about 1400.

12. The polymeric vehicle as recited in claim 6, wherein the polyol is an acrylic polymer having a number average molecular weight of from about 500 to about 5,000 and wherein the phenol blocked isocyanate has a molecular weight in the range of from about 500 to about 1400.

13. The polymeric vehicle as recited in claim 6, wherein the polyol is an alkyd polymer having a number average molecular weight of from about 500 to about 10,000 and wherein the phenol blocked isocyanate has a molecular weight in the range of from about 500 to about 1400.

14. The polymeric vehicle as recited in claim 6, wherein the polyol is an epoxy polymer having a number average molecular weight of from about 500 to about 6,000 and wherein the phenol blocked isocyanate has a molecular weight in the range of from about 500 to about 1400.

15. The polymeric vehicle as recited in claim 6, wherein the polyol and the phenol blocked isocyanate are each in respective amounts for providing a coating binder made from the cured polymeric vehicle with a pencil hardness of at least about HB and an impact resistance of at least 30-inch pounds direct and at least about 30-inch pounds reverse.

16. The polymeric vehicle as recited in claim 15, wherein the polyol is a polyester having a number average molecular weight of from about 200 to about 20,000.

17. The polymeric vehicle as recited in claim 15, wherein the polyol is an acrylic polymer having a number average molecular weight of from about 500 to about 5,000.

18. The polymeric vehicle as recited in claim 15, wherein the polyol is an alkyd polymer having a number average molecular weight of from about 500 to about 6,000.

19. The polymeric vehicle as recited in claim 15, wherein the polyol is an epoxy polymer having a number average molecular weight of from about 500 to about 6,000.

20. The polymeric vehicle as recited in claim 15, wherein the polymeric vehicle has a second hardener which is a diphenolic hardener.

21. A phenolic urethane compound which is the reaction product of a compound having an isocyanate functionality of from about 1.9 to about 20 isocyanate groups per molecule and a phenolic ester alcohol having at least one aliphatic hydroxyl group and at least one phenolic hydroxyl group, about one equivalent of isocyanate being reacted with about every equivalent of phenolic hydroxyl group which is a part of the phenolic ester alcohol, the compound having isocyanate functionality and the phenolic ester alcohol forming a blend wherein the compound having the isocyanate functionality reacts with a phenolic hydroxyl group of the phenolic ester alcohol, the phenolic ester alcohol forming a phenolic blocking group which blocks the isocyanate functionality, wherein the phenolic ester alcohol has the general formula

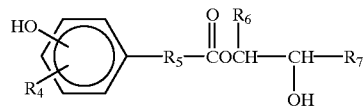

wherein $R_4$ is selected from the group consisting of hydrogen, halogen, hydroxyl, $C_1$ to $C_8$ alkyl and $C_1$ to $C_8$ alkoxy, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, $R_6$ is selected from the group consisting of hydrogen, a $C_1$ to $C_{20}$ organic radical, and a $C_1$ to $C_{20}$ organic radical which includes in its structure at least one ester linkage or a direct bond which forms with $R_7$ part of a 5 or 6 carbon atom cyclic ring structure, $R_7$ is $CH_2R_8$ wherein $R_8$ is selected from the group consisting of hydroxy, $OR_9$,

and $R_{11}$, wherein $R_9$ is selected from the group consisting of a primary or secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_{10}$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms, and combinations thereof, wherein the primary, secondary and tertiary aliphatic groups include at least one ester linkage; and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, and combinations thereof, the phenolic blocking group after the reaction having at least one aliphatic hydroxyl group unreacted with the compound having isocyanate functionality.

22. The phenolic urethane compound as recited in claim 21, wherein the reaction of the isocyanate and the phenolic ester alcohol is catalyzed by a tertiary amine and the isocyanate compound is selected from the group consisting of an isocyanate, an uretdione, a biuret, an isocyanurate and mixtures thereof.

23. A polymeric vehicle comprising a phenol blocked isocyanate which has the general formula

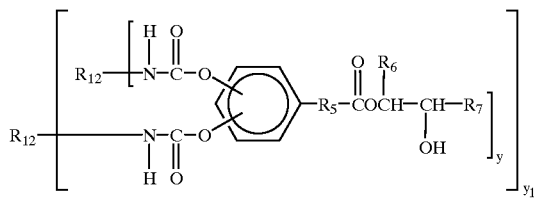

wherein y is 1 to 4, $y_1$ is 1 to 4, and where $R_{12}$ is a residue of a multifunctional isocyanate compound, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, $R_6$ is selected from the group consisting of hydrogen, a $C_1$ to $C_{20}$ organic radical, and a $C_1$ to $C_{20}$ organic radical which includes in its structure at least one ester linkage or a direct bond which forms with $R_7$ part of a 5 or 6 carbon atom cyclic ring structure, $R_7$ is $CH_2R_8$ wherein $R_8$ is selected from the group consisting of hydroxy, $OR_9$,

and $R_{11}$, wherein $R_9$ is selected from the group consisting of a primary or secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_{10}$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms, and combinations thereof, wherein the primary, secondary and tertiary aliphatic groups include at least one ester linkage; and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, and combinations thereof.

24. The polymeric vehicle as recited in claim 23, wherein the phenol blocked isocyanate has the formula

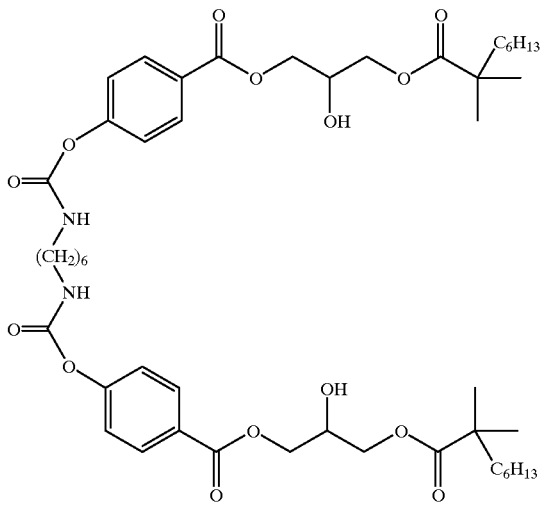

25. The polymeric vehicle as recited in claim 23 where $R_{12}$ is selected from the group consisting of

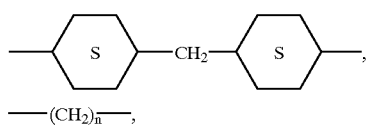

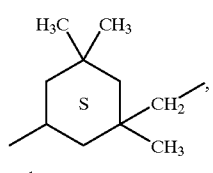

and

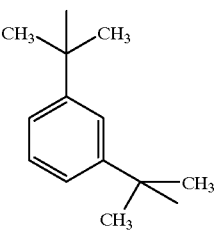

wherein n is greater than 1.

26. The polymeric vehicle as recited in claim 23, wherein the phenol blocked isocyanate has the formula

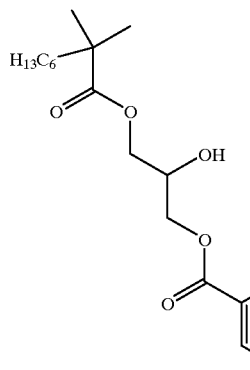
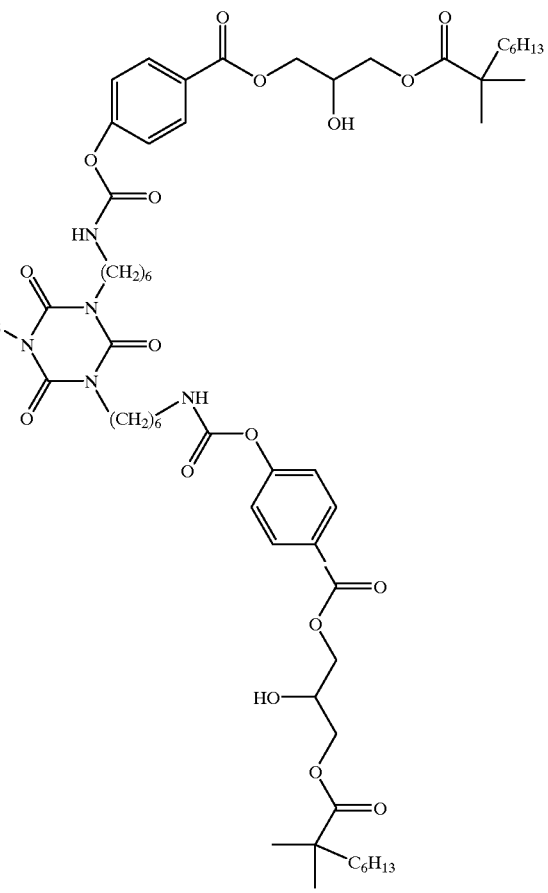

27. A polymeric vehicle comprising:
a polyol selected from the group consisting of a polyester polyol, an alkyd polymer polyol, an acrylic polymer polyol, an epoxy polymer polyol and mixtures thereof; and
a phenol blocked isocyanate,
the phenol blocked isocyanate being the reaction product of a compound having an average isocyanate functionality of from about 1.9 to about 20 isocyanate groups per molecule and a phenolic ester alcohol having at least one aliphatic hydroxyl group and at least one phenolic hydroxyl group wherein about one equivalent of isocyanate is reacted with about every equivalent of phenolic hydroxy group which is a part of the phenolic ester alcohol and wherein the phenolic ester alcohol is the reaction product of a phenolic carboxylic acid and an epoxy functional compound,
wherein the phenolic ester alcohol has at least two ester groups and has the general formula

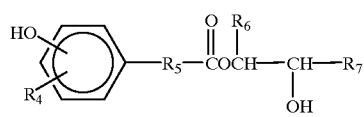

wherein $R_4$ is selected from the group consisting of hydrogen, halogen, hydroxyl, $C_1$ to $C_8$ alkyl and $C_1$ to $C_8$ alkoxy, $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof, $R_6$ is selected from the group consisting of hydrogen, a $C_1$ to $C_{20}$ organic radical, and a $C_1$ to $C_{20}$ organic radical which includes in its structure at least one ester linkage or a direct bond which forms with $R_7$ part of a 5 or 6 carbon atom cyclic ring structure, $R_7$ is $CH_2R_8$ wherein $R_8$ is selected from the group consisting of hydroxy, $OR_9$,

and $R_{11}$,
wherein $R_9$ is selected from the group consisting of a primary or secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage,
wherein $R_{10}$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms, and combinations thereof, wherein the primary, secondary and tertiary aliphatic groups include at least one ester linkage; and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, and combinations thereof.

28. The polymeric vehicle as recited in claim 27, wherein the phenolic carboxylic acid is parahydroxybenzoic acid and the epoxy functional compound has the formula

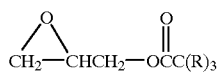

where each R represents an aliphatic group, the three R groups having a total of 8 carbon atoms.

29. A polymeric vehicle comprising:
a compound having blocked isocyanate functionality which has a general formula

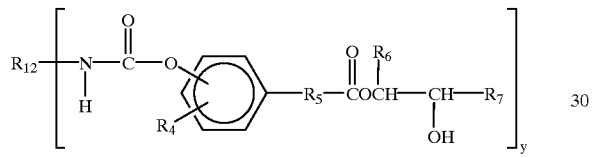

wherein y is 1 to 4,
wherein $R_{12}$ is a residue of a multifunctional isocyanate compound,
wherein $R_4$ is selected from the group consisting of hydrogen, halogen, hydroxyl, $C_1$ to $C_8$ alkyl and $C_1$ to $C_8$ alkoxy,
wherein $R_5$ is selected from the group consisting of a direct bond, $C_1$ to $C_{20}$ organic radical having only carbon and hydrogen atoms, and a $C_1$ to $C_{20}$ organic radical which includes in its structure a substitution group selected from the group consisting of phenol, aliphatic hydroxyl, ester, ether, carbonate and combinations thereof,
wherein $R_6$ is selected from the group consisting of hydrogen, a $C_1$ to $C_{20}$ organic radical, and a $C_1$ to $C_{20}$ organic radical which includes in its structure at least one ester linkage or a direct bond which forms with $R_7$ part of a 5 or 6 carbon atom cyclic ring structure,
wherein $R_7$ is $CH_2R_8$ wherein $R_8$ is selected from the group consisting of hydroxy, $OR_9$,

and $R_{11}$,
wherein $R_9$ is selected from the group consisting of a primary or secondary aliphatic group containing 3 to 20 carbon atoms, an aromatic group containing 6 to 20 carbon atoms, a primary aliphatic group containing 3 to 20 carbon atoms which includes at least one ester linkage and a secondary aliphatic group containing 3 to 20 carbon atoms which includes at least one ester linkage, wherein $R_{10}$ is selected from the group consisting of a primary aliphatic group containing 4 to 20 carbon atoms, a secondary aliphatic group containing 4 to 20 carbon atoms, a tertiary aliphatic group containing 4 to 20 carbon atoms, an aromatic group containing 6 to 20 carbon atoms, and combinations thereof, wherein the primary, secondary and tertiary aliphatic groups include at least one ester linkage; and wherein $R_{11}$ is selected from the group consisting of a $C_2$ to $C_{20}$ organic radical, a $C_2$ to $C_{20}$ organic radical which includes in its structure at least one ester linkage, a $C_2$ to $C_{20}$ organic radical which forms with $R_6$ part of a 5 or 6 carbon atom cyclic ring structure, and combinations thereof.

30. A polymeric vehicle as recited in claim 29 where $R_{12}$ is selected from the group consisting of

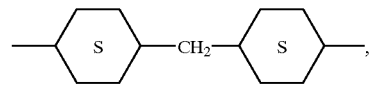

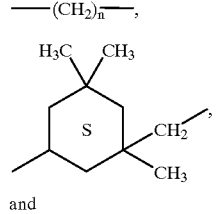

and

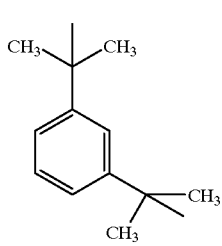

wherein n is greater than 1.

31. A polymeric vehicle as recited in claims 29 or 30 wherein the polymeric vehicle further comprises a polyol selected from the group consisting of a polyester polyol, an alkyd polymer polyol, an acrylic polymer polyol, an epoxy polymer polyol and mixtures thereof.

* * * * *